Jan. 21, 1958 J. E. BEVINS ET AL 2,820,364
FLUID FLOW MEASURING APPARATUS
Filed Jan. 31, 1952 3 Sheets-Sheet 1

INVENTORS
JAMES E. BEVINS
EDWARD J. HAZEN
BY C. R. Miranda
ATTORNEY

Jan. 21, 1958 J. E. BEVINS ET AL 2,820,364
FLUID FLOW MEASURING APPARATUS
Filed Jan. 31, 1952 3 Sheets-Sheet 2

INVENTORS
JAMES E. BEVINS
EDWARD J. HAZEN
BY C. R. Miranda
ATTORNEY

Jan. 21, 1958  J. E. BEVINS ET AL  2,820,364
FLUID FLOW MEASURING APPARATUS
Filed Jan. 31, 1952  3 Sheets-Sheet 3

INVENTORS
JAMES E. BEVINS
EDWARD J. HAZEN
BY C. R. Miranda
ATTORNEY

# United States Patent Office 2,820,364
Patented Jan. 21, 1958

2,820,364

FLUID FLOW MEASURING APPARATUS

James E. Bevins, Ramsey, and Edward J. Hazen, Westwood, N. J., assignors to Bendix Aviation Corporation, Teterboro, N. J., a corporation of Delaware Application January 31, 1952, Serial No. 269,262

14 Claims. (Cl. 73—210)

This invention generally relates to fluid measuring apparatus and more particularly to apparatus for measuring the flow of a fluid in gravimetric terms, preferably compensated for changes in fluid density.

Experience in the measurement of fluids has shown that the density of the fluid must be taken into consideration if a correct measurement is to be obtained because the density varies not only with different fluids but also with changes in temperature. Thus, in any apparatus used for measuring weight flow of fluids, density becomes an important factor when the fluids are exposed to extreme temperature changes.

In the operation of present day aircraft, it is extremely important for the pilot to know the exact amount of fuel consumed because of the large amounts of fuel required by the craft's engines in a relatively short period of time. If the density of the fuel is not taken into consideration, an indication of the amount of fuel consumed, or the amount remaining in the fuel tanks, will be incorrect and conceivably the pilot may be forced to land at a place other than that originally contemplated.

The present invention, therefore, contemplates a novel density sensing apparatus for effecting an indication of the instantaneous density or condition of a fluid which may be subjected to density changes because of temperature changes. The density sensing apparatus embodies a float responsive to the density of a liquid and is displaceable from a reference or balanced position to operate a signal developing device which develops signals corresponding to the displacement of the float from the reference position. The developed signals are amplified to drive a reversible motor which in turn is drivably connected to a slidable mass positioned on a member pivotally mounting the float. The mass moves relative to the float and effects the return of the latter to the reference position to balance the system, whereby the signal developing device is brought back to a no-signal developing position and the motor is deenergized. The motor, also, is connected to drive a signal generator having a rotor winding angularly displaceable relative to a stator winding and the relative movement thereof determines the magnitude of the signal generated. The sensing apparatus is so calibrated that the position of the mass, on the member pivotally mounting the float, corresponds to the density of the liquid and the displacement of the rotor winding of the signal generator is calibrated with respect to the position of the mass so that the signal therefrom corresponds to the density of the fluid.

The present invention is also contemplated for use with a novel fluid flow measuring apparatus which utilizes a servo-positioned variable area orifice to sense the rate of fluid flow. Novel means are employed to introduce a quantity which is a function of the density of the fluid from the density sensing apparatus into the fluid flow measuring apparatus whereby the measurement of flow is corrected for density, and density compensated indications of mass rate of fluid flow may be obtained.

An object of the present invention, therefore, is to provide a novel density determining apparatus for measuring the density of a fluid.

Another object is to provide a novel fluid flow measuring apparatus which utilizes a servo-positioned variable area orifice to determine the rate of fluid flow through a conduit.

A further object is to provide a novel fluid flow measuring system wherein means are provided to introduce a quantity which is a function of the density of the fluid into a fluid flow measuring apparatus whereby the measurement of fluid flow is corrected for density, and density compensated indications of rate of fluid flow are obtained thereby.

A still further object is to provide a novel density corrected gravimetric flowmeter.

The above and other objects and advantages of the present invention will appear more fully hereinafter from a consideration of the detailed description which follows taken together with the accompanying drawings wherein one embodiment of the invention is illustrated.

In the drawings, wherein like reference characters refer to like parts throughout the several views.

Figure 1:
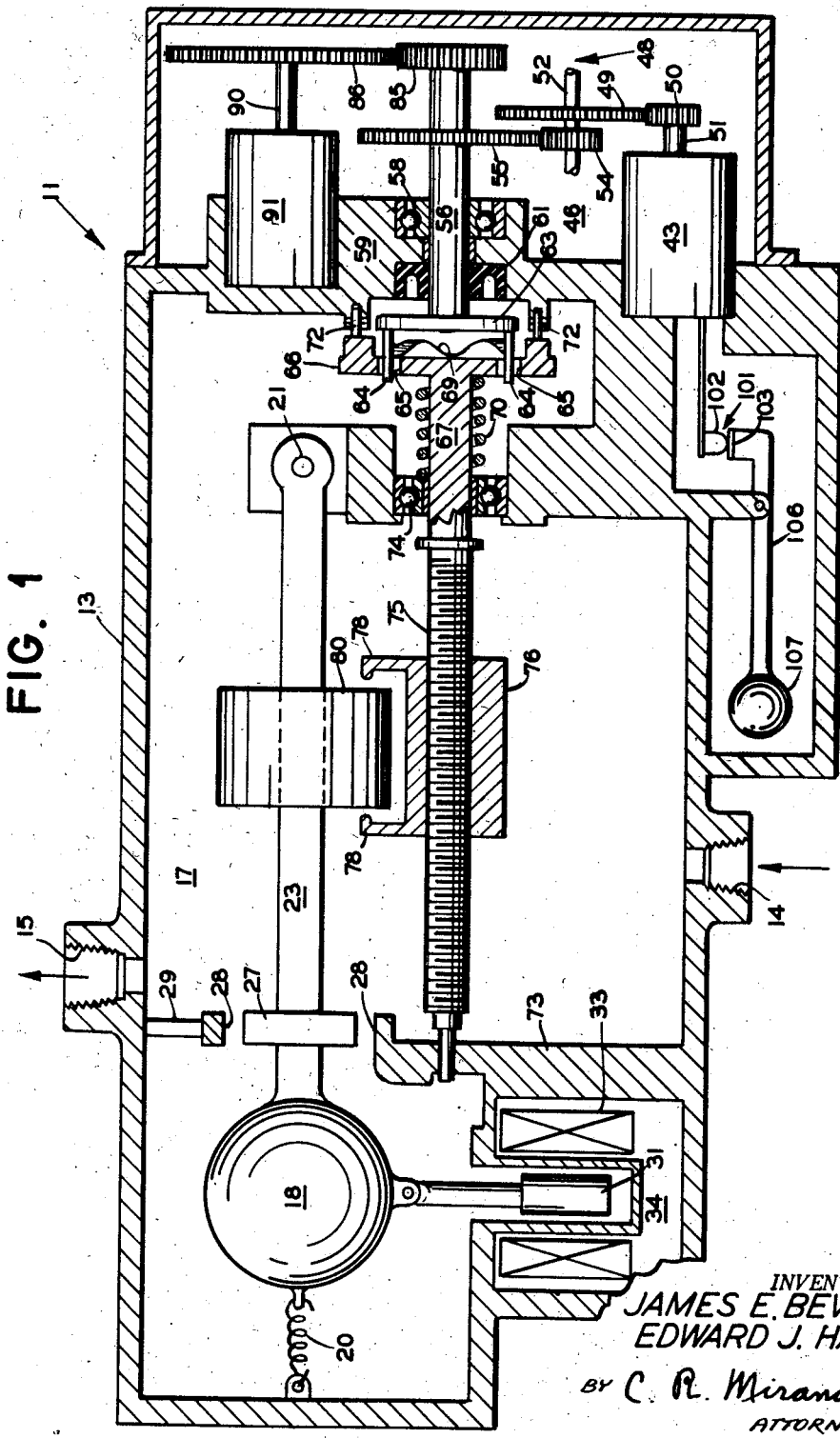
Fig. 1 is an elevational view, partly in section of the novel density sensing apparatus embodying the present invention.

Referring now to the drawings for a more detailed description of the present invention, and more particularly to Fig. 1 wherein one embodiment hereof is clearly illustrated, the density sensing apparatus, generally designated by the numeral 11, comprises a housing 13 which is filled with a liquid (not shown) from a supply line (not shown). The liquid enters housing 13 through an inlet port 14 and leaves the housing through an outlet port 15 so that apparatus 11 constantly samples the liquid flowing through the supply line. The rate at which the liquid enters and leaves housing 13 is small, and therefore, the passage thereof does not affect the accuracy of the mechanism in the housing, to be described presently.

Formed in housing 13 is a chamber 17 which has located therein a specific gravity response element or float 18. Float 18 is maintained at all times completely submerged in the liquid and is releasably held in a reference or balanced position by a weak helical spring 20. The position of the float as seen in Fig. 1 is to be understood as the reference or balanced position. Pivotally mounting float 18 for movement about a very low friction bearing pin 21, and supporting the float, is an arm 23 which is located in chamber 17. Arm 23 has a stop element 27 thereon which is adapted to engage a pair of spaced stops 28 to thereby limit the displacement of float 18 from the reference position.

The float has pivotally connected to the underside thereof a soft iron core 31. Associated with core 31 is a signal developing device or variable output transformer 33 supported in a chamber 34 sealed from chamber 17 so that no liquid is present therein. Transformer 33 comprises a primary winding 35 (Fig. 2) which is connected through a power transformer 35A to a suitable source of alternating current and is inductively associated with a pair of secondary windings 36 and 37 forming part of transformer 33. Windings 36 and 37 are connected in such a manner that the voltages induced therein buck or oppose each other so that normally a zero signal output is obtained. This is true when float 18 is in the reference position at which time core 31 is in a centralized position with respect to the secondary windings. Under this condition there is an equal amount of iron in each of the secondary windings. If core 31 is displaced in a direction away from winding 36, however, the voltage in winding 37 will be greater and a resultant output will be effected. If the core moves away from winding 37 then the voltage across winding 36 will be greater to effect a signal output opposite in phase to the signal from winding 37. In this manner, the signal output from transformer 33 will be of a phase and magnitude determined by the direction and amount of core displacement from the centralized position.

Figure 2:
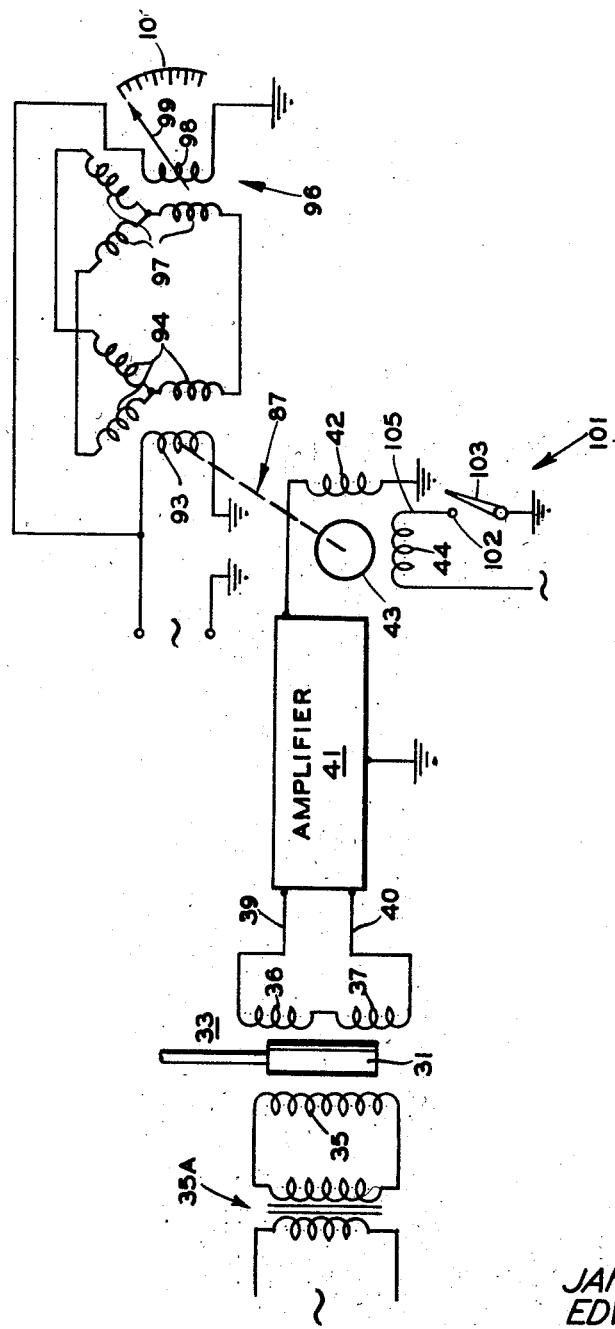
Fig. 2 is a diagrammatic representation of the electrical components employed with the density sensing apparatus of Fig. 1.

Connected to receive the output of transformer 33, by way of conductors 39 and 40, is a conventional amplifier 41, shown as a box in Fig. 2, which contains a phase discriminator (not shown) for discriminating the phase of the signal from the transformer. The output of amplifier 41 is fed to the variable phase winding 42 of a two phase reversible motor 43 (Figs. 1 and 2) having a fixed phase winding 44 constantly energized with alternating current. Motor 43 is driven in one direction or the other at a speed depending upon the direction and amount of displacement of core 31 from its centralized position with respect to the windings.

Motor 43 is located in a chamber 46 (Fig. 1) sealed from chamber 17 so that no liquid is present therein. Situated also in chamber 46 is a gear train, generally designated by the numeral 48, which has an input gear 49 constantly in mesh with a pinion 50 on motor shaft 51. Gear 49 is mounted on a shaft 52 which carries a gear 54 in engagement with a relatively large gear 55 fixed to a low speed driving shaft 56 journalled for rotation in bearings 58 retained in a wall 59 separating chambers 17 and 46. Disposed in wall 59 and on shaft 56 is a circular neoprene seal 61 which prevents seepage of liquid into chamber 46 from chamber 17. Shaft 56 carries at an end extending into chamber 17 a flat circular plate 63 which has disposed thereon diametrically opposed pins 64 projecting into openings 65 formed in a member 66 integral with a screw shaft 67. Member 66 has a contoured or cam surface 69 formed thereon which is biased by a spring 70 into contact with a pair of cam followers or rollers 72 mounted on wall 59. Spring 70 is disposed on shaft 67 which is journalled for rotation at one end in a wall 73 of housing 13, and, at another point adjacent the opposite end, in bearings 74. Formed on shaft 67 between wall 73 and bearings 74 is a threaded portion 75 which cooperates with an internally threaded portion of a travelling nut element 76 having a pair of upstanding and spaced contact fingers 78. Means, not shown, are provided for preventing rotation of the traveling nut element 76. Slidably disposed on arm 23 is a substantially rectangular balancing mass or weight 80, a portion of which extends between contact fingers 78.

Considering now the operation of the arrangement described, let it be assumed that the system is balanced and thereafter the density of the liquid is decreased because of a change in temperature affecting the liquid. Float 18, therefore, moves downwardly from its balanced position to move core 31 in a direction towards winding 37 to effect a signal which is amplified to drive motor 43. Energization of motor 43 effects rotation of shafts 56 and 67 through gear train 48 to displace element 76 to the right (Fig. 1). Since mass 80 extends between contact fingers 78, the left contact finger will engage the mass to slide it in the same direction. As the mass slides along arm 23, float 18 will be returned gradually until it reaches the balanced or reference position and core 31 will be displaced back to its centralized position, thereby effecting deenergization of motor 43 and cessation of motion of shafts 56 and 67 and mass 80. The system is now balanced and the position of the mass on the arm corresponds to the density of the liquid. It is apparent from the foregoing that the direction of rotation of the motor, and the direction of motion of the mass will be reversed if the density increases.

In order to allow float 18 to sense the density of the liquid under low friction conditions, that is, permit movement of the float without any load thereon due to frictional contact between contact fingers 78 and mass 80, cam surface 69 and rollers 72 are provided. When shaft 56 is rotated, it may be seen that surface 69 will engage rollers 72 to axially displace lead screw shaft 67 in opposite directions, thereby providing for intermittent point contact of the mass by contact fingers 78. The contacting surfaces of the fingers are small and they contact mass 80 for an instant only to "nudge" or displace the mass along the arm. Since the fingers do not bear continually on mass 80 and pin 21 engenders very little friction in the movement of arm 23, substantially frictionless motion of the float is obtained. It is apparent from the foregoing that without the intermittent contacting of the mass by the fingers, a friction load will be imposed on the movement of the float which will decrease the sensitivity of the system.

Driving shaft 56 carries on an opposite end thereof a gear 85 which meshes with a relatively large gear 86 fixed to a rotor shaft 90 of a signal generator generally designated by the numeral 91. Gears 85 and 86 comprise a speed reduction gear train 87 which is indicated in Fig. 2 as a broken line. Signal generator 91 is diagrammatically shown in Fig. 2 as comprising a single phase rotor winding 93 energized from a suitable source of alternating current and a three phase stator winding 94. Rotor winding 93 is angularly displaceable relative to stator winding 94 and the movement thereof determines the magnitude of a signal developed in the stator winding. Since motor 43 effects positioning of mass 80 on arms 23 and the position thereof corresponds to the density of the liquid, it may be seen that the displacement of rotor shaft 90 of signal generator 91 may be calibrated with respect to the sensing system to develop signals corresponding to the position of the mass and/or the density of the liquid.

The signals developed by signal generator 91 may be transmitted to a remotely located inductive follow-up device 96 diagrammatically shown in Fig. 2 as comprising a three phase stator winding 97 connected back to back with winding 94 and a displaceable single phase rotor winding 98 energized with alternating current. Rotor winding 98 will assume the same angular position as rotor winding 93 and by mounting a pointer 99 on the rotor shaft of inductive follow-up device 96, an indication of the density of the liquid may be obtained by reading the position of the pointer on a scale 100 associated therewith.

Density sensing apparatus 11 may be utilized in aircraft for indicating the density of the fuel consumed by the craft. In this case, a cut-off switch 101 comprising a stationary contact 102 and a movable contact 103 may be used to open the circuit to motor 43 during negative acceleration of the craft or when the craft may be temporarily operated upside down. Contact 102 is connected to a conductor 105 leading to one side of fixed phase winding 44 while contact 103 is grounded. Contact 103 comprises one end of a pivoted lever 106 (Fig. 1) which supports a mass 107 at its opposite end. In normal flight, contacts 102 and 103 engage and motor 43 operates with changes in density of the fuel. If the craft is subjected to negative accelerations or inverted flight, mass 107 swings lever 106 around its pivot to disengage the contacts, thereby opening the circuit to the motor. In this manner erratic operation of the system, which would displace mass 80 along arm 23 to effect incorrect indications of density, is prevented.

Figure 3:
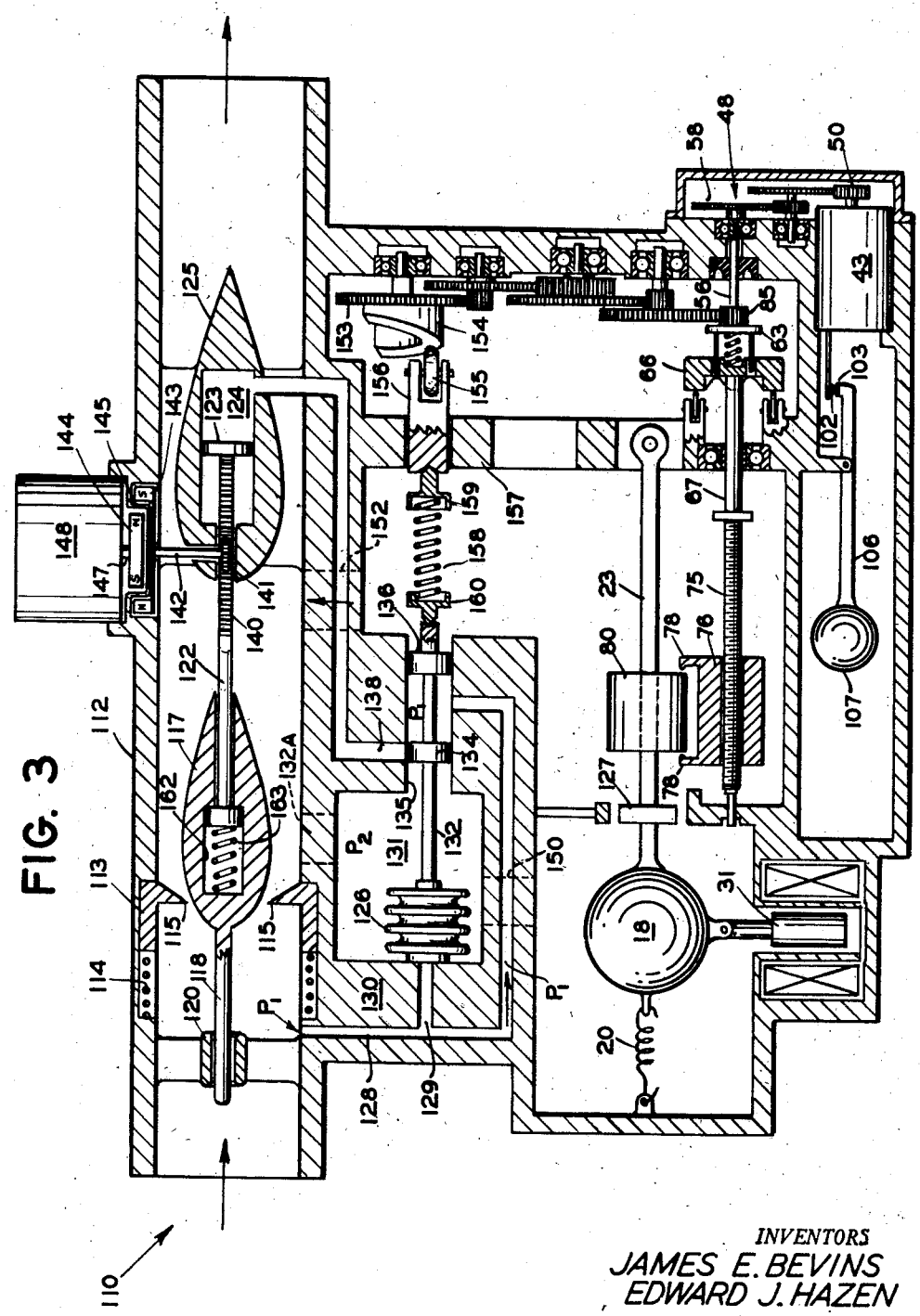
Fig. 3 is an elevational view, in section, of the fluid flow measuring system utilizing a slightly modified form of the density sensing apparatus of Fig. 1.

In Fig. 3 there is illustrated a fluid flow measuring apparatus generally designated by the numeral 110 which utilizes a slightly modified arrangement of the density sensing apparatus of Fig. 1 to effect a signal corresponding to the gravimetric rate of flow of liquid through a conduit 112 having a restricted opening. The theoretical basis for obtaining the rate of flow through a conduit is based on the proposition that if the pressure drop of the fluid flowing through a restricted opening or orifice inserted in a pipe or closed channel is maintained constant, the size of the opening determines the quantity of fluid passing therethrough. By varying the size of the opening and maintaining the pressure drop constant, different quantities of fluid will flow therethrough. If means are provided for indicating the size of the opening, it is possible to determine and measure the amount of fluid flowing through the opening, provided the pressure drop is maintained constant. If the pressure drop is made to vary as a function of density, then the size of the opening will correspond to gravimetric fluid flow rate compensated for density. The following familiar equations show the theoretical basis of this operation.

It is known that the volumetric flow through an orifice is:

$$V_F = K_1 A \sqrt{\Delta h}$$

where $V_F$ = volume flow rate
$K_1$ = a constant
$A$ = area of the orifice
$\Delta h$ = drop of head across the orifice since $$V_F = \frac{W_F}{\rho}$$

where $W_F$ = weight flow rate
$\rho$ = density of liquid
and $$\Delta h = \frac{\Delta P}{\rho}$$

where $\Delta P$ = pressure drop across the orifice. Therefore the gravimetric flow rate is:

$$W_F = K_1 A \rho \sqrt{\frac{\Delta P}{\rho}}$$

$$W_F = K_1 A \sqrt{\rho} \sqrt{\Delta P}$$

If the pressure drop is made to vary as a function of the density so that $$\sqrt{\rho} \sqrt{\Delta P} = K_2$$

then $W_F = K_1 A K_2$ or $W_F = K_3 A$ where $K_2$, $K_3$ = constants.

Thus under the conditions specified, weight flow is directly proportional to orifice area so that an instrument can be calibrated directly in weight of flow units.

Fluid flow measuring apparatus 110 embodies the above in providing in conduit 112, a cup shaped member 113 biased by a spring 114 to the right and having an orifice plate with an opening or orifice 115 formed therein. Liquid enters conduit 112 from the left, as seen in Fig. 3, passes through orifice 115 to leave from the right hand end of the conduit. Movable in orifice 115 so as to vary the area thereof is a displaceable flow resisting member or streamlined plug 117 having an end 118 journalled for axial displacement in a bearing member 120 located in the conduit. From the foregoing, it will be readily seen that the space between the edges of orifice 115 and plug 117 defines the orifice area, the size of which is varied by movement of the plug relative to the opening. The rear of plug 117 has a bore formed therein which accommodates an end portion of a connecting element 122, the latter having an opposite end 123 which is piston-shaped. End 123 is axially displaceable within a chamber 124 formed in a second streamlined plug 125 located in conduit 112.

The pressure created by the flow of liquid upstream or to the left of the orifice plate is designated in Fig. 3 as $P_1$ and is transmitted to the interior of a differential pressure motor or bellows 126 by way of passageways 128 and 129. Bellows 126 is fixed at one end to a wall 130 of a chamber 131 which contains the bellows. Chamber 131 and the exterior of bellows 126 are subjected to the pressure $P_2$ of the liquid downstream of or to the right of the orifice plate by a passageway 132A shown in broken lines, whereby the movable end of the bellows is displaced in accordance with the differential pressure across the bellows. Connected to the movable end of bellows 126 is a rod element 132 which carries a pilot valve member 134 slidable in a passageway 135 communicating with chamber 131. Spaced from valve 134 and carried by rod 132 is an auxiliary valve element 136 slidable in passageway 135. The portion of passageway 135 bounded by valves 134 and 136 is subjected to pressure $P_1$ by way of passageway 128. Pilot valve 134 is adapted to block an opening leading to a passageway 138 communicating with chamber 124 in streamlined plug 125.

When there is constant flow of liquid through conduit 112, the elements just described are in positions shown in Fig. 3. If an increase in flow occurs, $P_1$ increases to unbalance the system thereby displacing the movable end of bellows 126 to the right. Pilot valve 134 moves in the same direction to uncover passageway 138 to permit liquid to flow out of chamber 124. As a result, plug 117 is moved to the right, to in turn displace piston end 123 in the same direction. The pressure of the liquid in chamber 124 is of a value less than $P_1$ but greater than $P_2$ so that the connection of passageway 138 to $P_2$ in chamber 131 permits the liquid to flow into chamber 131. Plug 117 continues moving to the right until the flow rate becomes constant, at which time the pressure drop across the orifice returns to its original value to effect the return of pilot valve 134 to its blocking position. The system is now balanced and a measure of the orifice area will indicate the rate of flow of the liquid.

Let it be assumed that there is a decrease in the flow of liquid through conduit 112. At that instant, the value of the pressure drop across the orifice will decrease and this condition will be present in chamber 131 so that the movable end of bellows 126 will be displaced to the left thereby moving pilot valve 134 in the same direction. Since the portion of passageway 135 bounded by valves 134 and 136 has liquid therein equal to the value of $P_1$, this liquid will force its way past valve 134 into passageway 138 to enter chamber 124 to displace piston 123 to the left. In moving to the left, piston 123 displaces plug 117 in the same direction to decrease the orifice area and when the pressure drop returns to its original value the system will be again balanced.

Connecting element 122, adjacent piston end 123, has formed thereon a toothed rack portion 140 which engages a pinion 141 fastened to a shaft 142. Connected to the other end of shaft 142 is a circular ring magnet 143 which is magnetically coupled to a disc magnet 144 positioned on the opposite side of a non-magnetic shield 145. Magnet 144 is fastened to the rotor shaft 147 of a signal generator 148 similar in construction to signal generator 91 of Figs. 1 and 2. Movement of element 122 will effect angular displacement of rotor shaft 147 through the magnetic coupling to cause a signal to be developed by the generator corresponding in phase and magnitude to the direction and amount of displacement of the connecting element. The linear displacement of connecting element 122 can be used to measure the orifice area, and by proper calibration, generator 148 develops signals corresponding to the rate of liquid flow. By utilizing an inductive receiver such as shown in Fig. 2, or any other receiver well known in the art, an indication of liquid flow rate may be obtained.

Measurement of the flow of liquid, compensated for density, may be obtained by making the pressure drop across orifice 115 vary as a function of the density. To this end, the density sensing apparatus of Fig. 1, slightly modified to introduce the density of the liquid into the arrangement just described, is used to impress a bias on pilot valve 134, corresponding to the density of the liquid.

Float 18, in Fig. 3, is entirely submerged in liquid which has a pressure of a valve corresponding to the value of $P_2$. The liquid which surrounds float 18 enters through a port 150, shown in broken lines in Fig. 3, and leaves through an exit port 152, shown in broken lines adjacent plug 125. Referring to Fig. 3, port 150 bypasses passage 128 and connects chamber 131 to the float chamber and port 152 bypasses passage 138 and connects the float chamber to the conduit 112. The elements of the density apparatus shown in Fig. 3 which correspond to the elements shown in Fig. 1 are designated with the same reference numerals for purposes of clarity. The operation of similar elements in both views are exactly the same and the main difference between the two is that in Fig. 3 the output of the density sensing apparatus is reflected in angular displacement of a gear 153 having a cam shaped member 154 carried thereon, rather than the generation of electrical signals. Cam 154 engages a cam follower or roller 155 rotatably carried by a sliding member 156 supported for axial displacement in a wall 157. The angular displacement of gear 153 and the formation of cam shaped member 154 is so calibrated with respect to the axial displacement of sliding member 156 that the displacement of the latter corresponds to the different positions of mass 80 on arm 23 and therefore, corresponds to the density of the liquid. The opposite end of sliding member 156 is biased to the right by a helical spring 158 fitted in spring retaining cap members 159 and 160. Spring cap 159 has a pointed end which engages sliding member 156 while spring cap 160 has a pointed end which engages an end of rod element 132. In effect, spring 158 serves to receive density changes as represented by movement of cam 154 and sliding member 156 to vary the null setting of bellows 126, and to vary pilot valve 134 which controls the pressure drop across the orifice. In this manner, the pressure drop is made to vary as a function of the density of the liquid. With the foregoing arrangement, it will be understood that the signal emanating from signal generator 148 will correspond to the weight rate of flow of liquid, compensated for density, which flows through orifice 115.

Formed in plug 117 is a chamber 162 which accommodates a spring 163 having one end bearing against the left end of connecting element 122 and the other end bearing against a wall of the chamber. Spring 163 normally restrains movement of plug 117 to the right when the plug is acted upon by the flow of liquid bearing against it. However, when a surge of liquid occurs in the normal direction of flow, spring 163 prevents the building up of excessively high differential pressures across the orifice by permitting the plug to be moved to the right, thereby increasing the area of the orifice so that the differential pressures will not be too great. Conversely, when a liquid surge occurs in an opposite direction, the bias of spring 114 is overcome so that cup-shaped member 113 may move to the left to increase the area of the orifice.

It will now be readily apparent that the present invention provides a novel density sensing apparatus which will accurately measure the density of a fluid subject to changes in density and/or fluids having varying densities. By providing a "nudging" motion of the balancing mass in response to changes in density of the liquid to be measured, highly accurate density indications may be obtained. Furthermore, by using the novel density sensing apparatus with a fluid flow measuring and responsive system, the gravimetric rate of flow of fluid passing through a conduit may be obtained which is compensated for changes in density of the fluid.

Although one embodiment of the invention has been illustrated and described in detail, it is to be expressly understood that the invention is not limited thereto. Various changes can be made in the design and arrangement of the parts without departing from the spirit and scope of the invention as the same will now be understood in the art.

We claim:

1. Means for providing substantially frictionless motion of a sensing member in returning to a balanced position when the member is displaced from said balanced position by changes in the condition of a fluid, comprising an element pivotally mounting said sensing member, a balancing mass slidable on said element and adapted for movement to a position to effect the return of said member to the balanced position, a displaceable member adapted to contact said mass to change the position thereof on said element, said displaceable member having an internally threaded portion formed therein, an exteriorly threaded shaft cooperating with the threaded portion of said displaceable member, and means for rotating and axially oscillating said shaft when the sensing member is displaced from said balanced position to effect axial and oscillatory movement of said displaceable member on said shaft, whereby the displaceable member intermittently contacts said balancing mass to permit said sensing member to return to the balanced position.

2. Means according to claim 1 wherein the means for rotating and axially oscillating the threaded shaft comprises a driven cam member fixed to the shaft, said cam member cooperating with a fixed cam follower to effect axial oscillation of the shaft.

3. Means for determining fuel density for use with aircraft, comprising a member displaceable from a reference position in response to changes in density of a fluid, an element connected to said member for pivotally mounting the latter, a mass slidable on said element and movable relative to said member, driven means responsive to the displacement of said member for displacing said mass on said element to return said member to the reference position, a motor drivably connected to said driven means, said motor adapted to be energized by said displacement signal to displace said driven means to return said member to the reference poistion, the position of said mass on said element corresponding to the density of the fluid, and a gravity sensitive switch connected in the electrical circuit of the motor and adapted to open said circuit when the craft is subjected to negative accelerations in flight, whereby the motor is deenergized to prevent displacement of said mass to false positions which do not correspond to the fluid density.

4. A liquid-flow measuring apparatus comprising a conduit for the flow of liquid therethrough in one direction, a plate in said conduit and having an orifice formed therein, a flow-opposing member movable in said orifice to vary the effective area thereof, means responsive to the differential pressure across said orifice for effecting movement of said flow-opposing member in said orifice, and resilient means biasing said plate in said one direction of flow, said resilient means maintaining said plate stationary when liquid flows in said one direction and permitting movement of said plate in an opposite direction when a liquid surge occurs in said conduit in a direction opposite to said one direction, whereby excessively high differential pressures are prevented from building up across said orifice.

5. In apparatus for measuring the mass flow of a fluid through a wall member having an orifice, the combination with said wall member of a flow-opposing member mounted for movement relative to said orifice to vary the effective area thereof, means connected to said flow-opposing member to move said flow-opposing member relative to said orifice, yieldable means responsive to changes in the pressure drop across said orifice, a member displaceable from a reference position in response to changes in the density of the fluid, means operatively connected to said displaceable member and movable relative thereto, actuating means responsive to displacements of said displaceable member to move said movable means relative to said displaceable member to return the latter to the reference position, the position of said movable means relative to said displaceable member corresponding to the density of the fluid, and means operable by said yieldable means and said actuating means to selectively communicate the fluid pressures on each side of said orifice to said connected means to actuate said connected means in accordance with changes in mass fluid flow through said orifice corrected for changes in fluid density to position said flow-opposing member relative to said orifice to maintain the pressure drop across said orifice substantially constant with changes in fluid flow but varied in accordance with changes in fluid density.

6. Apparatus for measuring the varying rates of flow of a fluid through a restricted orifice, comprising a flow-opposing member mounted for movement relative to said orifice without closing said orifice to vary the effective area thereof and vary the pressure drop across said orifice, yieldable means responsive to a change in pressure across said orifice resulting from a change in fluid flow, means connected to said flow-opposing member for moving said flow-opposing member relative to said orifice, and means operated by said yieldable means for selectively communicating the fluid pressures on each side of said orifice with said connected means so that said last-mentioned means produces actuation of said connected means with changes in fluid flow through said orifice to position said flow-opposing member to maintain the pressure drop across said orifice substantially constant with changes in fluid flow.

7. The invention defined in claim 6 including means sensitive to changes in the density of the fluid for altering the pressures applied to said connected means and the position of said flow opposing member in accordance with change in fluid density.

8. Apparatus for measuring the varying rates of flow of a fluid through a restricted orifice, comprising a flow-opposing member mounted for movement relative to said orifice without closing said orifice to vary the effective area thereof and vary the pressure drop across said orifice, yieldable means responsive to a change in pressure across said orifice resulting from a change in fluid flow, means connected to said flow-opposing member for moving said flow-opposing member relative to said orifice, means operated by said yieldable means for selectively communicating the fluid pressures on each side of said orifice with said connected means so that said last-mentioned means produces actuation of said connected means with changes in fluid flow through said orifice to position said flow-opposing member to maintain the pressure drop across said orifice substantially constant with changes in fluid flow, and signal generating means operable by said connected means for developing a signal corresponding to the rate of fluid flow through said orifice.

9. Apparatus for measuring the varying rates of flow of a fluid, comprising a conduit for receiving the flow of fluid and having a restricted orifice therein, a flow-opposing member movable in said orifice without closing said orifice to vary the effective area of said orifice and to vary the pressure drop across said orifice, pressure responsive means for controlling the position of said flow-opposing member in said orifice, a differential pressure motor having a movable wall, means for subjecting one side of said wall to the fluid pressure on one side of said orifice and for subjecting the other side of said wall to the fluid pressure on the other side of said orifice, a displaceable pilot valve member drivably connected to said differential pressure motor, said valve member being displaced by said differential pressure motor to communicate selectively the fluid pressures on each side of said orifice with said pressure responsive controlling means so that an increase in fluid flow through the orifice produces displacement of said valve member to expose said pressure responsive controlling means to the pressure on said one side of said orifice while a decrease in fluid flow produces displacement of said valve member to expose said pressure responsive controlling means to the pressure on said other side of said orifice.

10. Apparatus according to claim 9 wherein said pressure responsive controlling means comprises a piston.

11. Apparatus for measuring fluid flow comprising a conduit for conducting the fluid and having an orifice therein, a hollow streamlined flow-opposing member axially movable in said orifice to vary the effective area thereof, a second hollow member positioned in said conduit downstream of said first member and coaxial therewith, said second member being streamlined to present minimum resistance to the flow of fluid passing by said second member, a connecting member having a piston-like end movable within said second streamlined member and having an opposite end in said first streamlined member, means responsive to the differential fluid pressure across said orifice for actuating the piston-like end of said connecting member to move said flow-opposing member within said orifice, and resilient means in said first streamlined member and bearing against said opposite end of said connecting member for permitting movement of said first streamlined member in a direction out of said orifice without corresponding movement of said connecting member when a fluid flow surge occurs in said conduit, whereby excessively high differential pressures are prevented from building up across said orifice.

12. In apparatus for measuring the mass rate of flow of fluid through an orifice wherein the pressure drop across the orifice is to be regulated so that the orifice area corresponds to the magnitude of the mass rate of fluid flow therethrough, comprising a flow-opposing member movable in said orifice to vary the effective area thereof, means controlling the position of said flow-opposing member in said orifice, displaceable means for actuating said controlling means to produce movement of said flow-opposing member, means operable in response to changes in the pressure drop across said orifice with changes in fluid flow through said orifice for displacing said displaceable means so that said flow-opposing member is positioned to maintain a substantially constant pressure drop across said orifice with changes in fluid flow, means for sensing the density of the fluid through said orifice including a member displaceable from a reference position in response to changes in the density of the fluid, means operatively connected to said displaceable member and movable relative thereto, actuating means responsive to the displacement of said displaceable member for moving said movable means relative to said displaceable member to return said displaceable member to the reference position, the extent of operation of said actuating means being a function of the change in density of the fluid, and means responsive to the operation of said actuating means for controlling said displaceable means as a function of fluid density so that each time the fluid density changes there is scheduled a new pressure drop to be maintained across said orifice.

13. Apparatus for measuring the mass rate of flow of fluid through an orifice wherein the pressure drop across the orifice is to be regulated so that the orifice area corresponds to the magnitude of the mass rate of fluid flow therethrough, comprising a flow-opposing member movable in said orifice to vary the effective area thereof, first control means controlling the position of said flow-opposing member in said orifice, displaceable means for actuating said controlling means to produce movement of said flow-opposing member, means operable in response to changes in the pressure drop across said orifice with changes in fluid flow through said orifice for displacing said displaceable means so that said flow-opposing member is positioned to maintain a substantially constant pressure drop across said orifice with changes in fluid flow, means for sensing the density of the fluid through said orifice including a member displaceable from a reference position in response to changes in the density of the fluid, means operatively connected to said displaceable member and movable relative thereto, actuating means responsive to the displacement of said displaceable member for moving said movable means relative to said displaceable member to return said displaceable member to the reference position, the extent of operation of said actuating means being a function of the change in density of the fluid, second control means responsive to the operation of said actuating means for controlling said displaceable means as a function of fluid density so that each time the fluid density changes there is scheduled a new pressure drop to be maintained across said orifice, and signal generating means under the control of said first control means for developing an electrical signal corresponding to the mass rate of flow of fluid through said orifice and corrected for changes in fluid density.

14. In apparatus for measuring the mass rate of flow of fluid through an orifice wherein the pressure drop across the orifice is to be regulated so that the orifice area corresponds to the magnitude of the mass rate of fluid flow therethrough, comprising a flow-opposing member movable in said orifice to vary the effective area thereof, means controlling the position of said flow-opposing member in said orifice, displaceable means for actuating said controlling means to produce movement of said flow-opposing member, means operable in response to changes in the pressure drop across said orifice with changes in fluid flow through said orifice for displacing said displaceable means so that said flow-opposing member is positioned to maintain a substantially constant pressure drop across said orifice with changes in fluid flow, means for sensing the density of the fluid through said orifice including a member displaceable from a reference position in response to changes in the density of the fluid, means operatively connected to said displaceable member and movable relative thereto, actuating means responsive to the displacement of said displaceable member for moving said movable means relative to said displaceable member to return said displaceable member to the reference position, the extent of operation of said actuating means being a function of the change in density of the fluid, and means including resilient means responsive to the operation of said actuating means for biasing said displaceable means in accordance with the fluid density so that each time the fluid density changes there is scheduled a new pressure drop to be maintained across said orifice.

References Cited in the file of this patent

UNITED STATES PATENTS

| | | |
|---|---|---|
| 1,487,402 | Roucka | Mar. 18, 1924 |
| 1,644,684 | Linderman | Oct. 11, 1927 |
| 1,677,834 | Linderman | July 17, 1928 |
| 1,682,602 | Dawley | Aug. 28, 1928 |
| 2,082,539 | Fischer | June 1, 1937 |
| 2,397,038 | Obenshain et al. | Mar. 19, 1946 |
| 2,530,981 | Mikina | Nov. 21, 1950 |
| 2,546,657 | Smoot | Mar. 27, 1951 |
| 2,595,250 | Harcum | May 6, 1952 |
| 2,607,214 | Schlueter | Aug. 19, 1952 |
| 2,609,831 | Macgeorge | Sept. 9, 1952 |
| 2,614,432 | Cloud | Oct. 21, 1952 |
| 2,661,023 | Griswold | Dec. 1, 1953 |

FOREIGN PATENTS

| | | |
|---|---|---|
| 612,054 | Great Britain | Nov. 8, 1948 |